United States Patent
Saiwaki

(10) Patent No.: US 9,764,595 B2
(45) Date of Patent: Sep. 19, 2017

(54) PNEUMATIC TIRE FOR USE IN TWO-WHEELED AUTOMOTIVE VEHICLE

(71) Applicant: SUMITOMO RUBBER INDUSTRIES, LTD., Kobe-shi, Hyogo (JP)

(72) Inventor: Izumi Saiwaki, Kobe (JP)

(73) Assignee: SUMITOMO RUBBER INDUSTRIES, LTD., Kobe-shi, Hyogo (JP)

(*) Notice: Subject to any disclaimer, the term of this patent is extended or adjusted under 35 U.S.C. 154(b) by 959 days.

(21) Appl. No.: 13/964,748

(22) Filed: Aug. 12, 2013

(65) Prior Publication Data

US 2014/0202605 A1    Jul. 24, 2014

(30) Foreign Application Priority Data

Jan. 21, 2013  (JP) .................................. 2013-007971

(51) Int. Cl.
*B60C 11/00* (2006.01)

(52) U.S. Cl.
CPC ......... *B60C 11/005* (2013.01); *B60C 11/0058* (2013.01); *B60C 2200/10* (2013.01)

(58) Field of Classification Search
CPC ............... B60C 11/005; B60C 11/0041; B60C 2200/10; B60C 11/0058
See application file for complete search history.

(56) References Cited

FOREIGN PATENT DOCUMENTS

| EP | 2147806 A1 * | 1/2010 | ............ B60C 11/00 |
|---|---|---|---|
| JP | 57-182502 U | 11/1982 | |
| JP | 63-117602 U | 7/1988 | |
| JP | 6-65418 A | 3/1994 | |
| JP | 7-195906 A | 8/1995 | |
| JP | 2004-50963 A | 2/2004 | |
| JP | 2005-271760 A | 10/2005 | |
| JP | 2010023577 A * | 2/2010 | |
| JP | 2012140068 A * | 7/2012 | |

OTHER PUBLICATIONS

Machine Translation: JP 2012140068 A; Kobayashi, Hiroyuki; no date.*
Machine Translation: JP 2010023577 A; Kamo, Shigeki; no date.*
Japanese Office Action, dated Dec. 2, 2014, for Japanese Application No. 2013-007971, including English translation.

* cited by examiner

*Primary Examiner* — Michael H Wilson
*Assistant Examiner* — Kendra Ly
(74) *Attorney, Agent, or Firm* — Birch, Stewart, Kolasch & Birch, LLP

(57) ABSTRACT

A tread 4 of a tire 2 includes a center region Ta, in an axial direction, including an equator plane, and a pair of shoulder regions Tb located outward of the center region Ta in the axial direction. Each shoulder region Tb includes a base layer 20, a middle layer 22 layered outward of the base layer 20 in a radial direction, and a top layer 24 layered outward of the middle layer 22 in the radial direction. A loss compliance LCt of the top layer 24 is set to be higher than a loss compliance LCm of the middle layer 22. The loss compliance LCm of the middle layer 22 is set to be higher than a loss compliance LCb of the base layer. A breaking energy Et of the top layer 24 is set to be less than a breaking energy Em of the middle layer 22.

5 Claims, 2 Drawing Sheets

PNEUMATIC TIRE FOR USE IN TWO-WHEELED AUTOMOTIVE VEHICLE

This application claims priority on Patent Application No. 2013-007971 filed in JAPAN on Jan. 21, 2013. The entire contents of this Japanese Patent Application are hereby incorporated by reference.

BACKGROUND OF THE INVENTION

Field of the Invention

The present invention relates to pneumatic tires that are to be mounted to two-wheeled automotive vehicles. More specifically, the present invention relates to improvement of treads of tires.

Description of the Related Art

In cornering of a two-wheeled automotive vehicle, a centrifugal force is applied to the two-wheeled automotive vehicle. In the cornering, a cornering force is necessary. The cornering force matches the centrifugal force. In the cornering, a rider leans the two-wheeled automotive vehicle toward an inner side. By the two-wheeled automotive vehicle being leaned, the cornering of the two-wheeled automotive vehicle is achieved. In order to facilitate the cornering, a tire for use in two-wheeled automotive vehicles includes a tread having a small radius of curvature. In straight running, the tread contacts with the ground at a center region of the tread. On the other hand, in cornering, the tread contacts with the ground at a shoulder region of the tread. A tire in which a center region and a shoulder region function according to their roles, respectively, is disclosed in JP2005-271760.

In this tire, a hardness of a crosslinked rubber in a center region of a tread is high, and a hardness of a crosslinked rubber in shoulder regions of the tread is low. Thus, in straight running, the tread contacts with the ground at the center region having a high hardness. The tire is excellent in steering stability in straight running. In cornering, the tread contacts with the ground at the shoulder region having a low hardness. The tire is excellent in grip performance in cornering.

The grip performance is influenced by a temperature of a tire. In the beginning of running, the temperature of a tire is low. In a tire that is flexible in a shoulder region, a high grip performance can be obtained in a state where the temperature of the tire is low. A hardness of a crosslinked rubber in the shoulder region is low. In the tire, the crosslinked rubber in the shoulder region becomes more flexible in a state where the temperature of the tire is high. This flexible state leads to reduction of stiffness in the shoulder region. The reduction of stiffness deteriorates steering stability. Further, the reduction of stiffness reduces wear resistance in the shoulder region of the tread. It is not easy to favorably obtain both a grip performance in the beginning of running in which the temperature of a tire is low, and a grip performance in a state where the temperature of the tire is sufficiently high after the beginning of running.

An object of the present invention is to make available a tire, for use in two-wheeled automotive vehicles, which exhibits an excellent grip performance in cornering from the beginning of running.

SUMMARY OF THE INVENTION

A tire, for use in a two-wheeled automotive vehicle, according to the present invention includes a tread. The tread includes a center region, in an axial direction, including an equator plane, and a pair of shoulder regions located outward of the center region in the axial direction. Each shoulder region includes a base layer, a middle layer layered outward of the base layer in a radial direction, and a top layer layered outward of the middle layer in the radial direction. A loss compliance LCt of a crosslinked rubber of the top layer is set so as to be higher than a loss compliance LCm of a crosslinked rubber of the middle layer. The loss compliance LCm of the crosslinked rubber of the middle layer is set so as to be higher than a loss compliance LCb of a crosslinked rubber of the base layer. A breaking energy Et of the crosslinked rubber of the top layer is set so as to be less than a breaking energy Em of the crosslinked rubber of the middle layer.

Preferably, in the tire, a thickness of the top layer is greater than or equal to 0.1 mm, and is not greater than 0.5 mm.

Preferably, in the center region of the tire, a tread surface that contacts with a road surface is formed by the base layer.

Preferably, a ratio (Wa/W) of a width Wa, in the axial direction, of the center region to a width W, in the axial direction, of the tread is greater than or equal to 0.1, and is not greater than 0.3. The tire is mounted to a rear wheel for a two-wheeled automotive vehicle.

Preferably, a ratio (Wa/W) of a width Wa, in the axial direction, of the center region to a width W, in the axial direction, of the tread is greater than or equal to 0.1, and is not greater than 0.5. The tire is mounted to a front wheel for a two-wheeled automotive vehicle.

In the tire, in cornering in the beginning of running, the top layer in the shoulder region contacts with the ground. The top layer allows grip performance to be sufficiently exhibited in a state where the temperature of the tire is low. Further, after rising of the temperature of the tire has occurred and the top layer has been worn, the middle layer contacts with the ground, to stably exhibit grip performance. The tire can exhibit, in cornering, high grip performance from the beginning of running in which the temperature is low, through to after the temperature becomes sufficiently high.

DESCRIPTION OF THE PREFERRED EMBODIMENTS

The following will describe in detail the present invention based on preferred embodiments with reference to the accompanying drawing.

Figure 1:
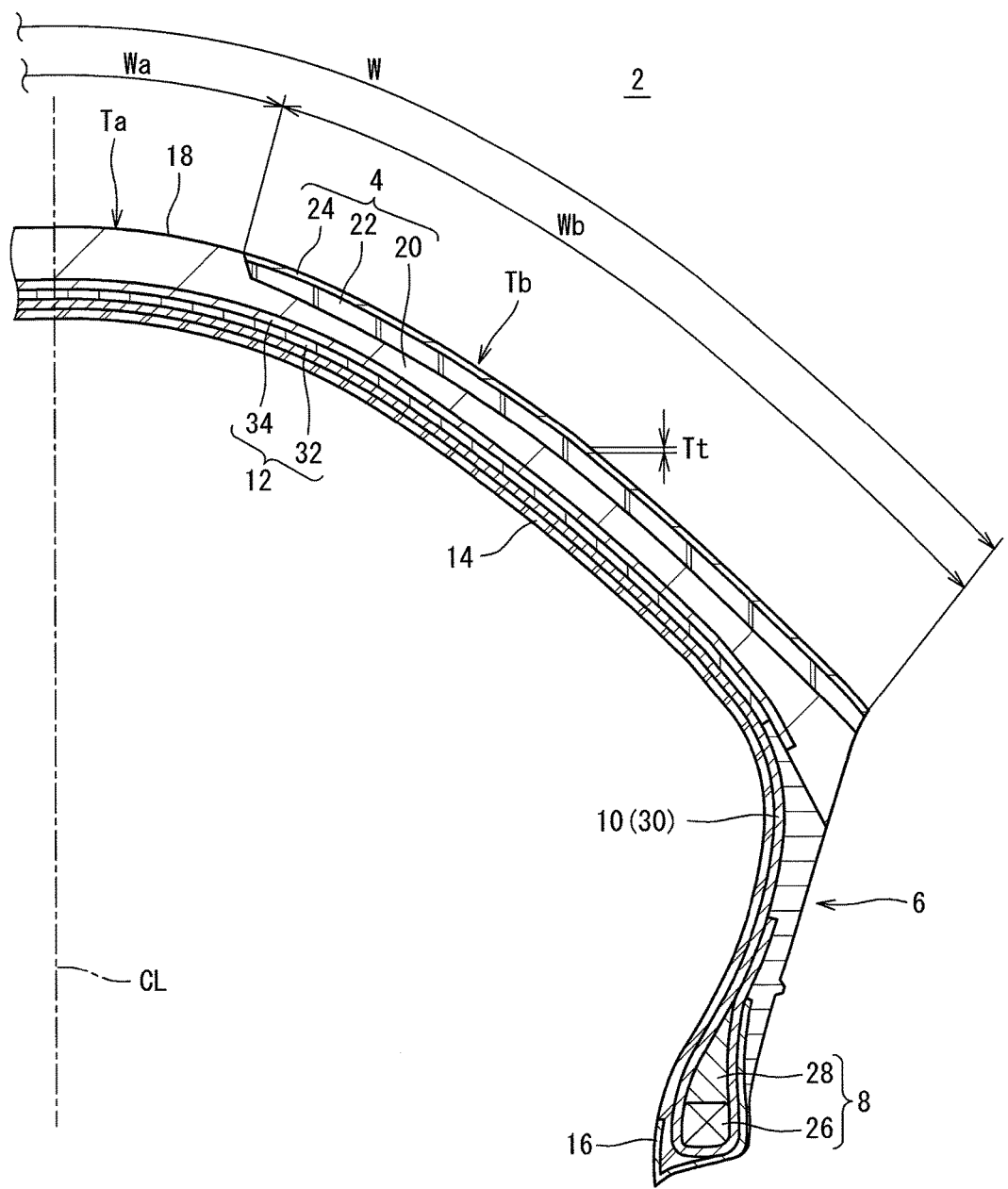
FIG. 1 is a cross-sectional view of a tire according to one embodiment of the present invention.

FIG. 1 shows a cross-section of a tire 2 according to the present invention. In FIG. 1, the upward/downward direction represents the radial direction, and the leftward/rightward direction represents the axial direction. An alternate long and short dash line CL represents the equator plane. The tire 2 includes a tread 4, sidewalls 6, beads 8, a carcass 10, a belt 12, an inner liner 14, and chafers 16. The tire 2 is a tubeless pneumatic tire. The tire 2 is mounted to a two-wheeled automotive vehicle.

An arrow W in FIG. 1 represents a width, in the axial direction, of the tread 4. The tread 4 has a center region Ta, and a pair of shoulder regions Tb. The center region Ta of the tread 4 includes the equator plane, and is a region that is bilaterally symmetric with respect to the equator plane, which is not shown. An arrow Wa represents a width, in the axial direction, of the center region Ta. The shoulder regions Tb of the tread 4 are a pair of regions that is located outward of the center region Ta in the axial direction. A double-headed arrow Wb represents a width, in the axial direction, of each shoulder region Tb. The widths W, Wa, and Wb are measured along a tread surface 18. In the tire 2, a ratio (Wa/W) of the width Wa of the center region Ta to the width W of the tread 4 is, for example, 0.25.

The tread 4 has a shape projecting outward in the radial direction. The tread 4 includes the tread surface 18 that contacts with a road surface. Each shoulder region Tb of the tire 2 includes a base layer 20, a middle layer 22, and a top layer 24. The base layer 20 is located on an innermost side, in the radial direction, of the tread 4. The middle layer 22 is layered outward of the base layer 20 in the radial direction. The top layer 24 is layered outward of the middle layer 22 in the radial direction. The center region Ta is formed of one layer being the base layer 20. In the tire 2, in the beginning of running, the tread surface 18 is formed by the top layer 24 of each shoulder region Tb and the base layer 20 of the center region Ta.

Each of the base layer 20, the middle layer 22, and the top layer 24 is formed by a crosslinked rubber composition. The rubber compositions of the base layer 20, the middle layer 22, and the top layer 24 are different from each other. A loss compliance LCt of the top layer 24 is higher than a loss compliance LCm of the middle layer 22. The loss compliance LCm of the middle layer 22 is higher than a loss compliance LCb of the base layer 20.

The sidewalls 6 extend from ends, respectively, of the tread 4 approximately inward in the radial direction. The sidewalls 6 are formed by a crosslinked rubber composition. The sidewalls 6 absorb impact from a road surface due to their flexure. Further, the sidewalls 6 prevent damage of the carcass 10.

The beads 8 extend from the sidewalls 6, respectively, approximately inward in the radial direction. Each bead 8 includes a core 26 and an apex 28 that extends from the core 26 outward in the radial direction. The apex 28 is tapered outward in the radial direction. The apex 28 is formed by a crosslinked rubber composition. The apex 28 has a high hardness.

The carcass 10 is formed by a carcass ply 30. The carcass ply 30 extends along inner surfaces of the tread 4 and the sidewalls 6. The carcass ply 30 is turned up around each core 26 from the inner side to the outer side in the axial direction. The carcass ply 30 is formed by cords and a topping rubber, which is not shown. The cord is formed by an organic fiber. Examples of preferable organic fiber include polyester fibers, nylon fibers, rayon fibers, polyethylene naphthalate fibers, and aramid fibers.

The belt 12 is located between the carcass 10 and the tread 4. The belt 12 includes an inner layer 32 and an outer layer 34. The outer layer 34 is layered outward of the inner layer 32 in the radial direction. The inner layer 32 and the outer layer 34 are each formed by cords and a topping rubber, which is not shown. A material of the cord is a steel or an organic fiber. Specific examples of the organic fiber include aramid fibers, nylon fibers, polyester fibers, rayon fibers, and polyethylene naphthalate fibers.

The inner liner 14 is bonded to an inner circumferential surface of the carcass 10. The inner liner 14 is formed by a crosslinked rubber. For the inner liner 14, a rubber that is excellent in air-sealing property is used. The inner liner 14 functions so as to maintain an internal pressure of the tire 2.

The chafers 16 are located near the beads 8, respectively. When the tire 2 is mounted to a rim, the chafers 16 abut on the rim, which is not shown. Portions near the beads 8 are protected due to the abutment.

The tire 2 thus illustrated is mounted to a rear wheel of a two-wheeled automotive vehicle when used. In the tire 2, the tread 4 contacts with the ground at the center region Ta in straight running. Since the tread surface 18 is formed by the base layer 20 in the center region Ta, the tire 2 is excellent in stability during straight running. In the tire 2, a ratio (Wa/W) of the width Wa of the center region Ta to the width W of the tread 4 is preferably greater than or equal to 0.1, and more preferably greater than or equal to 0.15. On the other hand, in cornering, the tread 4 contacts with the ground at the shoulder region Tb. Since the tread surface 18 is formed by the top layer 24 in the shoulder region Tb, the tire 2 is excellent in grip performance in cornering. In the tire 2, the ratio (Wa/W) is preferably not greater than 0.3, and more preferably not greater than 0.25.

In cornering in the beginning of running, the top layer 24 of the tire 2 contacts with the ground. The loss compliance LCt of the top layer 24 is high. The top layer 24 exhibits a sufficient grip performance from the beginning of running. The tire 2 is excellent in grip performance in cornering in the beginning of running.

From the viewpoint that the tire is allowed to exhibit grip performance in the beginning of running, the loss compliance LCt of the top layer 24 is preferably higher than or equal to 1.1 ($MPa^{-1}$). The loss compliance LCt is more preferably higher than or equal to 1.2 ($MPa^{-1}$), and particularly preferably higher than or equal to 1.3 ($MPa^{-1}$). On the other hand, excellent wear resistance can be exhibited by the top layer 24 in which the loss compliance LCt is low. In this viewpoint, the loss compliance LCt is preferably not higher than 1.6 ($MPa^{-1}$). The loss compliance LCt is more preferably not higher than 1.5 ($MPa^{-1}$), and particularly preferably not higher than 1.4 ($MPa^1$).

The middle layer 22 is disposed inward of the top layer 24 in the radial direction, to contribute to enhancement of a stiffness of the shoulder region Tb. In the viewpoint that the stiffness is enhanced, the loss compliance LCm of the middle layer 22 is preferably less than or equal to 1.1 ($MPa^{-1}$), more preferably less than or equal to 1.05 ($MPa^{-1}$), and particularly preferably less than or equal to 1.0 ($MPa^{-1}$). On the other hand, grip performance can be sufficiently exhibited in the tire 2 in which the loss compliance LCm is high also when the top layer 24 is worn and the middle layer 22 contacts with the ground. In this viewpoint, the loss compliance LCm is preferably not less than 0.8 ($MPa^{-1}$), more preferably not less than 0.85 ($MPa^{-1}$), and particularly preferably not less than 0.9 ($MPa^{-1}$).

Further, since the base layer 20 is disposed inward of the middle layer 22 in the radial direction, reduction of stiffness in the shoulder region Tb is suppressed. In this viewpoint, the loss compliance LCb of the base layer 20 is preferably less than or equal to 1.0 ($MPa^{-1}$), more preferably less than or equal to 0.95 ($MPa^{-1}$), and particularly preferably less than or equal to 0.9 ($MPa^{-1}$). On the other hand, from the viewpoint that grip force can be sufficiently exerted in straight running, the loss compliance LCb of the base layer 20 is preferably not less than 0.7 ($MPa^{-1}$), more preferably not less than 0.75 ($MPa^{-1}$), and particularly preferably not less than 0.8 ($MPa^{-1}$).

In the top layer 24 in which the loss compliance LCt is high, a heat generating property is excellent. In the top layer 24, the temperature thereof rises early. A breaking energy Et of the top layer 24 is set so as to be less than a breaking energy Em of the middle layer 22. Thus, when a temperature rises, wear of the top layer 24 is accelerated. The top layer 24 is worn, and the middle layer 22 contacts with the ground. By the middle layer 22 contacting with the ground, after the rising of the temperature of the tire, grip performance can be sufficiently exhibited. From the viewpoint that the top layer 24 is worn early, the breaking energy Et is preferably less than or equal to 2000 (Mpa·%), more preferably less than or equal to 1800 (MPa·%), and particularly preferably less than or equal to 1600 (MPa·%). On the other hand, from the viewpoint that, in the beginning of running, the top layer 24 contacts with the ground to sufficiently exhibit grip performance, the breaking energy Et is preferably not less than 1000 (MPa·%), more preferably not less than 1200 (MPa·%), and particularly preferably not less than 1400 (MPa·%).

From the viewpoint that, also when the top layer 24 is worn, and the middle layer 22 contacts with the ground, grip performance can be sufficiently exhibited, the breaking energy Em of the middle layer 22 is preferably higher than or equal to 2000 (MPa·%), more preferably higher than or equal to 2200 (MPa·%), and particularly preferably higher than or equal to 2400 (MPa·%).

A double-headed arrow Tt in FIG. 1 represents a thickness of the top layer 24. The thickness Tt is measured at the center, in the axial direction, of the shoulder region Tb. The thickness Tt is measured in the direction of the normal to the tread surface 18 on a cross-section that is cut from the tire 2, as shown in FIG. 1.

In the tire 2, since the thickness Tt of the top layer 24 is small, the top layer 24 is worn early. Thus, the middle layer 22 contacts with the ground, and grip performance can be sufficiently exhibited after the beginning of running. From the viewpoint that the middle layer 22 is caused to contact with the ground after the top layer 24 is worn, the thickness Tt is preferably less than or equal to 0.5 mm, and more preferably less than or equal to 0.4 mm. On the other hand, in the tire 2 in which the thickness Tt is great, the top layer 24 contacts with the ground in the beginning of running in which the temperature of the tire is low, and grip performance can be sufficiently exhibited. From this viewpoint, the thickness Tt is preferably not less than 0.1 mm, and more preferably not less than 0.2 mm.

The tire 2 exhibits high grip performance from the beginning of running in which the temperature of the tire is low, through to after sufficient rising of the temperature of the tire. Furthermore, reduction of stiffness is suppressed as well as the high grip performance is exhibited. Deterioration of steering stability and reduction of wear resistance in the shoulder region Tb are suppressed.

The loss compliance LC is represented as a ratio ($E''/(E^*)^2$) of a loss elastic modulus $E''$ to the square of a complex elastic modulus $E^*$. In the present invention, a complex elastic modulus $E^*$ and a loss elastic modulus $E''$ of the top layer 24 at 100° C. are used to calculate the loss compliance LCt of the top layer 24. The complex elastic modulus $E^*$ and the loss elastic modulus $E''$ are measured in compliance with the standard of "JIS K 6394", by using a viscoelasticity spectrometer (manufactured by Iwamoto Seisakusho), under the following measurement conditions.

Initial strain: 10%
Amplitude: ±2.5%
Frequency: 10 Hz
Deformation mode: tension
Measurement temperature: 100° C.

For measuring the complex elastic modulus $E^*$ and the loss elastic modulus $E''$, a test piece formed by a rubber composition of the top layer 24 is used. The test piece is plate-shaped, and the length thereof is 45 mm, the width thereof is 4 mm, and the thickness thereof is 2 mm. The test piece is chucked at both end portions, and the measurement is made. The length of a displaced portion of the test piece is 30 mm. The loss compliance LCb of the base layer 20 and the loss compliance LCm of the middle layer 22 are calculated in the same manner as for the top layer 24. For measuring, for the calculation, the complex elastic modulus $E^*$ and the loss elastic modulus $E''$, at 100° C., of each of the base layer 20 and the middle layer 22, a test piece formed by a rubber composition of each of the base layer 20 and the middle layer 22 of the tread 4 is used.

The breaking energy Et of the top layer 24 is obtained in compliance with the standard of "JIS K6251" entitled "Rubber, vulcanized or thermoplastics-Determination of tensile stress-strain properties". A rubber slab sheet is produced from a rubber composition of the top layer 24. The rubber slab sheet is subjected to heat aging process at 100° C. for 72 hours, to be thermally aged, and is then punched, thereby obtaining test pieces from the rubber slab sheet. A tensile strength (TB) and elongation at break (EB) of the test piece are measured. The breaking energy Et is obtained based on the tensile strength (TB) and elongation at break (EB) according to the following equation.

$$Et=(TB)\cdot(EB)/2$$

The breaking energy Em of the middle layer 22 is obtained, by using a rubber composition of the middle layer 22, in the same manner as for the breaking energy Et.

In the present invention, the dimensions and angles of the components of the tire 2 are measured in a state where the tire 2 is mounted to a normal rim, and the tire 2 is inflated with air to a normal internal pressure, unless otherwise specified. During the measurement, no load is applied to the tire 2. In the description herein, the normal rim represents a rim that is specified according to the standard with which the tire 2 complies. The "standard rim" in the JATMA standard, the "Design Rim" in the TRA standard, and the "Measuring Rim" in the ETRTO standard are included in the normal rim. In the description herein, the normal internal pressure represents an internal pressure that is specified according to the standard with which the tire 2 complies. The "maximum air pressure" in the JATMA standard, the "maximum value" recited in "TIRE LOAD LIMITS AT VARIOUS COLD INFLATION PRESSURES" in the TRA standard, and the "INFLATION PRESSURE" in the ETRTO standard are included in the normal internal pressure.

Figure 2:
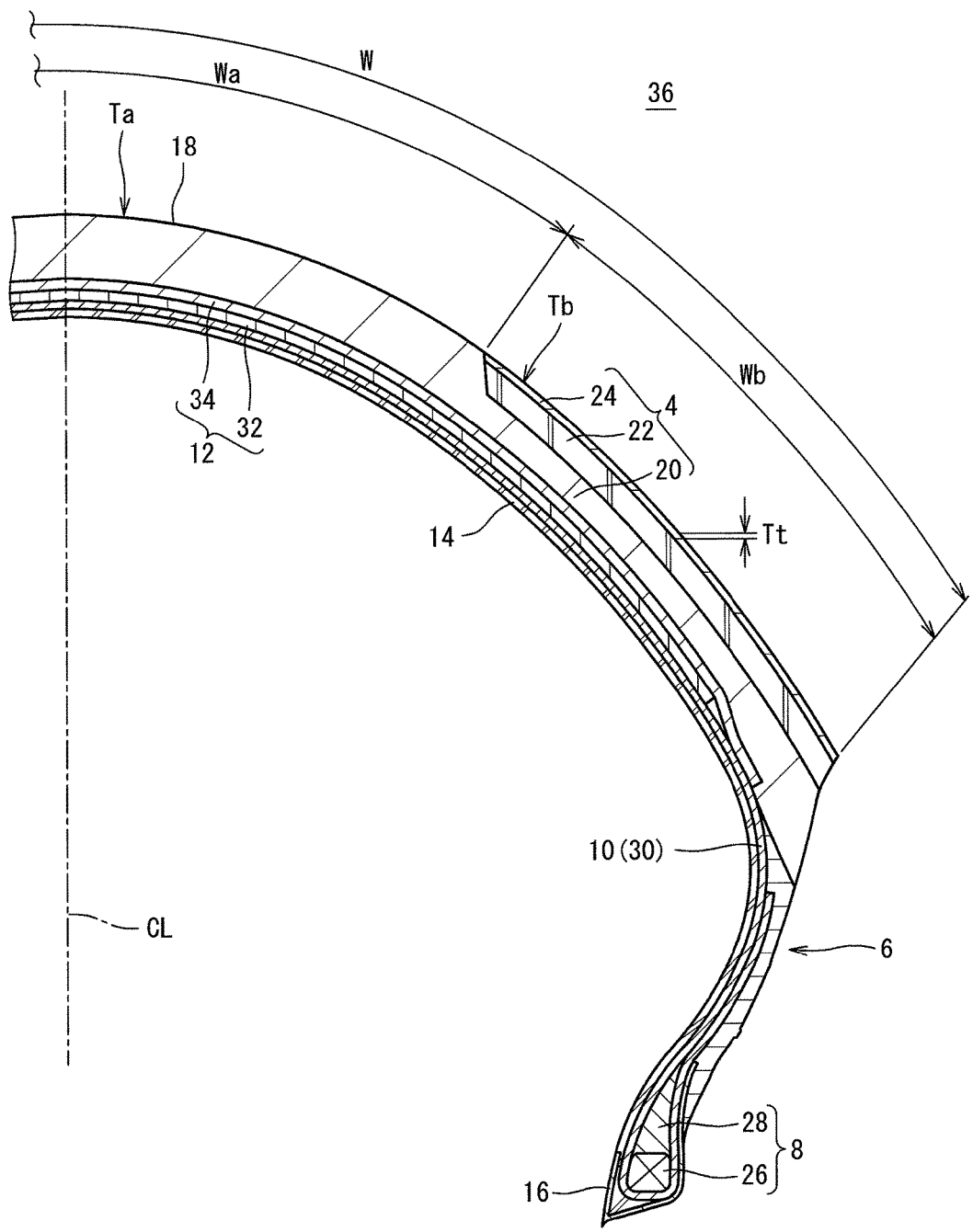
FIG. 2 is a cross-sectional view of a tire according to another embodiment of the present invention.

FIG. 2 shows a cross-section of a tire 36 according to the present invention. The tire 36 is mounted to a front wheel of a two-wheeled automotive vehicle. The description of the same components as those of the tire 2 is not given. In the description for the tire 36, the same components as those of the tire 2 are denoted by the same reference numerals as used for the tire 2. Also in the tire 36, a tread 4 contacts with the ground at a center region Ta in straight running. In this viewpoint, a ratio (Wa/W) of a width Wa of the center region Ta to a width W of the tread 4 is preferably greater than or equal to 0.1, and more preferably greater than or equal to 0.15. On the other hand, in cornering, the tread 4 contacts with the ground at a shoulder region Tb. In this viewpoint, the ratio (Wa/W) is preferably not greater than 0.5, and more preferably not greater than 0.45.

When the tire 36 is used for front tires, high grip performance can be exhibited from the beginning of running in which the temperature of the tire is low, through to after sufficient rising of the temperature of the tire. Further, reduction of stiffness can be suppressed as well as the high grip performance can be exhibited. The tire 36 enables deterioration of steering stability and reduction of wear resistance in the shoulder region Tb to be suppressed.

EXAMPLES

Hereinafter, effects of the present invention will become apparent according to examples. However, the present invention should not be restrictively construed based on the description of examples.

Example 1

A rear tire having the structure shown in FIG. 1 was obtained. The size of the tire was "190/50ZR17". In the tire, a loss compliance LCb of a crosslinked rubber of a base layer in a tread, a loss compliance LCm and a breaking energy Em of a crosslinked rubber of a middle layer in the tread, and a loss compliance LCt and a breaking energy Et of a crosslinked rubber of a top layer in the tread were as indicated in Table 1. In Example 1, values of the loss compliance and the breaking energy are indicated as indexes on the assumption that each value of a tire of Comparative example 1 is 100. A thickness Tt of the top layer of the tire was as indicated in Table 1.

Comparative Examples 1 to 3

Tires were each obtained in the same manner as for Example 1 except that crosslinked rubbers of a top layer, a middle layer, and a base layer were as indicated in Table 1. In each of the tires, the top layer, the middle layer, and the base layer were formed by the same crosslinked rubber. The tires each had a tread formed by substantially a single crosslinked rubber.

Examples 2 to 5

Tires were each obtained in the same manner as for Example 1 except that crosslinked rubbers of a top layer, a middle layer, and a base layer were as indicated in Table 2.

Example 6

A tire was obtained in the same manner as for Example 4 except that a thickness Tt of a top layer was as indicated in Table 2.

Examples 7 to 11

Tires were each obtained in the same manner as for Example 1 except that a thickness Tt of a top layer was as indicated in Table 3.

Example 12

A front tire having the structure shown in FIG. 2 was obtained. The size of the tire was "120/70ZR17". In the tire, a loss compliance LCb of a crosslinked rubber of a base layer in a tread, a loss compliance LCm and a breaking energy Em of a crosslinked rubber of a middle layer in the tread, and a loss compliance LCt and a breaking energy Et of a crosslinked rubber of a top layer in the tread were as indicated in Table 4. In Example 12, values of the loss compliance and the breaking energy are indicated as indexes on the assumption that each value of a tire of Comparative example 4 is 100. A thickness Tt of the top layer of the tire was as indicated in Table 4.

Comparative Examples 4 to 6

Tires were each obtained in the same manner as for Example 12 except that crosslinked rubbers of a top layer, a middle layer, and a base layer were as indicated in Table 4. In each of the tires, the top layer, the middle layer, and the base layer were formed by the same crosslinked rubber. The tires each had a tread formed by substantially a single crosslinked rubber.

Examples 13 to 16

Tires were each obtained in the same manner as for Example 12 except that crosslinked rubbers of a top layer, a middle layer, and a base layer were as indicated in Table 5.

Example 17

A tire was obtained in the same manner as for Example 15 except that a thickness Tt of a top layer was as indicated in Table 5.

[Evaluation of Grip Performance]

Test tires were mounted to a two-wheeled automotive vehicle that was dedicated to races and that had an engine displacement of 1000 cc. A width of a rim for a rear wheel was 6.0 inches, and a width of a rim for a front wheel was 3.5 inches. An air pressure in the tire was 250 kPa. When the tires of Examples 1 to 11 and Comparative examples 1 to 3 were mounted to the rear wheels, conventional tires were used as they were for the front wheels. On the other hand, when the tires of Examples 12 to 17 and comparative examples 4 to 6 were mounted as front tires, conventional tires were used as they were for the rear wheels. The two-wheeled automotive vehicle was caused to perform 10 laps of running on a circuit course, and a sensory evaluation for grip performance was made by a rider. The results are indicated below in Tables 1 to 5. The evaluation is indicated as an index for the rear tires based on the assumption that an evaluation for the tire of Comparative example 1 in the beginning of running is 100. The evaluation is indicated as an index for the front tires based on the assumption that an evaluation for the tire of Comparative example 4 in the beginning of running is 100. The greater the index value is, the higher the evaluation is.

TABLE 1

| | Evaluation results | | | |
|---|---|---|---|---|
| | Example 1 | Comparative example 1 | Comparative example 2 | Comparative example 3 |
| LCt | 110 | 100 | 110 | 90 |
| LCm | 100 | 100 | 110 | 90 |
| LCb | 90 | 100 | 110 | 90 |
| Et | 90 | 100 | 90 | 110 |
| Em | 100 | 100 | 90 | 110 |
| Thickness Tt (mm) | 0.3 | 0.3 | 0.3 | 0.3 |
| Grip performance in first lap | 108 | 100 | 110 | 91 |
| Grip performance in tenth lap | 97 | 95 | 86 | 90 |

TABLE 2

Evaluation results

|  | Example 2 | Example 3 | Example 4 | Example 5 | Example 6 |
|---|---|---|---|---|---|
| LCt | 120 | 130 | 120 | 130 | 120 |
| LCm | 100 | 100 | 90 | 90 | 90 |
| LCb | 90 | 90 | 80 | 80 | 80 |
| Et | 85 | 80 | 85 | 80 | 85 |
| Em | 100 | 100 | 110 | 110 | 110 |
| Thickness Tt (mm) | 0.3 | 0.3 | 0.3 | 0.3 | 1.0 |
| Grip performance in first lap | 113 | 116 | 110 | 113 | 115 |
| Grip performance in tenth lap | 97 | 93 | 97 | 92 | 90 |

TABLE 3

Evaluation results

|  | Example 9 | Example 7 | Example 8 | Example 10 | Example 11 |
|---|---|---|---|---|---|
| LCt | 110 | 110 | 110 | 110 | 110 |
| LCm | 100 | 100 | 100 | 100 | 100 |
| LCb | 90 | 90 | 90 | 90 | 90 |
| Et | 90 | 90 | 90 | 90 | 90 |
| Em | 100 | 100 | 100 | 100 | 100 |
| Thickness Tt (mm) | 0.1 | 0.2 | 0.4 | 0.5 | 0.7 |
| Grip performance in first lap | 105 | 107 | 109 | 110 | 111 |
| Grip performance in tenth lap | 99 | 98 | 97 | 95 | 92 |

TABLE 4

Evaluation results

|  | Example 12 | Comparative example 4 | Comparative example 5 | Comparative example 6 |
|---|---|---|---|---|
| LCt | 110 | 100 | 110 | 90 |
| LCm | 100 | 100 | 110 | 90 |
| LCb | 90 | 100 | 110 | 90 |
| Et | 90 | 100 | 90 | 110 |
| Em | 100 | 100 | 90 | 110 |
| Thickness Tt (mm) | 0.3 | 0.3 | 0.3 | 0.3 |
| Grip performance in first lap | 107 | 100 | 109 | 92 |
| Grip performance in tenth lap | 98 | 95 | 87 | 89 |

TABLE 5

Evaluation results

|  | Example 13 | Example 14 | Example 15 | Example 16 | Example 17 |
|---|---|---|---|---|---|
| LCt | 120 | 130 | 120 | 130 | 120 |
| LCm | 100 | 100 | 90 | 90 | 90 |
| LCb | 90 | 90 | 80 | 80 | 80 |
| Et | 85 | 80 | 85 | 80 | 85 |
| Em | 100 | 100 | 110 | 110 | 110 |
| Thickness Tt (mm) | 0.3 | 0.3 | 0.3 | 0.3 | 1.0 |
| Grip performance in first lap | 112 | 117 | 111 | 114 | 115 |
| Grip performance in tenth lap | 98 | 94 | 96 | 93 | 91 |

As indicated in Tables 1 to 5, the tires of Examples are superior in grip performance from the first lap of running in which the temperature of the tire was low, through the tenth lap of running in which rising of the temperature of the tire had been sufficient, as compared to the tires of Comparative examples. Further, in these tires, deterioration of steering stability and reduction of wear resistance in the shoulder regions were suppressed. The evaluation results clearly indicate that the present invention is superior. It is also clear that, when the tires of the present invention are used as a pair of tires such that the tire of each of Examples 1 to 11 is mounted to a rear wheel, and the tire of each of Examples 12 to 17 is mounted to a front wheel, suppression of deterioration in steering stability and reduction of wear resistance in the shoulder regions can be enhanced.

The tire of the present invention can be mounted to various two-wheeled automotive vehicles.

The foregoing description is in all aspects illustrative, and various modifications can be made without departing from the essential features of the invention.

What is claimed is:

1. A tire for use in a two-wheeled automotive vehicle, the tire comprising
    a tread that includes a center region, in an axial direction, including an equator plane, and a pair of shoulder regions located outward of the center region in the axial direction, wherein
    each shoulder region includes a base layer, a middle layer layered outward of the base layer in a radial direction, and a top layer layered outward of the middle layer in the radial direction,
    the top layer is present in the shoulder regions but not in the center region,
    the entire top layer is layered radially outward of an outer surface of the middle layer,
    the top layer is formed from a crosslinked rubber having a loss compliance LCt that is set so as to be higher than a loss compliance LCm of the crosslinked rubber that forms the middle layer,
    the loss compliance LCm of the crosslinked rubber of the middle layer is set so as to be higher than a loss compliance LCb of the crosslinked rubber that forms the base layer, and
    the top layer crosslinked rubber breaking energy Et is set so as to be less than the middle layer crosslinked rubber breaking energy Em.

2. The tire according to claim 1, wherein a thickness of the top layer is greater than or equal to 0.1 mm, and is not greater than 0.5 mm.

3. The tire according to claim 1, wherein, in the center region, a tread surface that contacts with a road surface is formed by the base layer.

4. The tire according to claim 1, wherein
a ratio (Wa/W) of a width Wa, in the axial direction, of the center region to a width W, in the axial direction, of the tread is greater than or equal to 0.1, and is not greater than 0.3, and
the tire is mounted to a rear wheel.

5. The tire according to claim 1, wherein
a ratio (Wa/W) of a width Wa, in the axial direction, of the center region to a width W, in the axial direction, of the tread is greater than or equal to 0.1, and is not greater than 0.5, and
the tire is mounted to a front wheel.

* * * * *